United States Patent [19]

Welschof

[11] 4,275,571
[45] Jun. 30, 1981

[54] HOMOKINETIC UNIVERSAL JOINT

[75] Inventor: Hans-Heinrich Welschof, Rodenbach, Fed. Rep. of Germany

[73] Assignee: Lohr & Bromkamp, Offenbach am Main, Fed. Rep. of Germany

[21] Appl. No.: 29,078

[22] Filed: Apr. 11, 1979

[30] Foreign Application Priority Data

Apr. 14, 1978 [DE] Fed. Rep. of Germany ....... 2816155

[51] Int. Cl.³ .............................................. F16D 3/30
[52] U.S. Cl. .............................................. 64/21; 64/7
[58] Field of Search .................................... 64/21, 7, 8

[56] References Cited

U.S. PATENT DOCUMENTS

| 1,975,758 | 10/1934 | Stuber | 64/21 |
| 3,603,111 | 9/1971 | Aucktor et al. | 64/21 |
| 3,822,570 | 7/1974 | Fisher | 64/21 |
| 4,034,576 | 7/1977 | Takahashi et al. | 64/21 |
| 4,156,353 | 5/1979 | Welschof | 64/21 |

FOREIGN PATENT DOCUMENTS 962454  7/1964  United Kingdom ........................ 64/21

Primary Examiner—Ira S. Lazarus
Assistant Examiner—Magdalen Moy

[57] ABSTRACT

A homokinetic universal joint having an outer member, an inner member arranged in the outer member, and torque-transmitting balls supported in window apertures of a cage which is arranged radially between the inner and outer joint members. The cage is formed on its radially outer side with a reduced diameter portion which extends axially thereof along the region of the longitudinal side of the window apertures adjacent the axially inner side of the outer member.

3 Claims, 4 Drawing Figures

1

HOMOKINETIC UNIVERSAL JOINT

BACKGROUND OF THE INVENTION

The present invention relates generally to universal joint assemblies and more particularly to a homokinetic universal joint having an outer joint member which is provided with a spherical hollow space in whose inner surface there are arranged grooves which are uniformly distributed over the circumference thereof. An inner joint member is arranged in the outer joint member, the inner joint member having a number of grooves in its outer surface which number corresponds to the number of grooves in the outer joint member, the grooves being arranged so that a groove of the outer joint member and the inner joint member will always jointly receive one of a plurality of torque-transmitting balls supported in window apertures of a cage which is arranged radially between the inner and outer joint members. The cage has inner and outer concentric spherical surfaces, and each two cooperating grooves of the inner and outer joint members are widened in the direction of the opening of the outer joint member for controlling the balls in the angle-bisecting plane, the cage with its spherical outer surface being guided in the hollow space of the outer joint member and with its spherical inner surface being guided on the spherical outer surface of the inner joint member.

Joints of the type described are known, for example from German Patent 1,267,915. In such joints, the cage rests, with relatively little play in the assembled state, with its outer surface against the inner surface of the outer joint member and with its inner surface against the outer surface of the inner joint member. To facilitate assembly of these joints, it is proposed to extend a window aperture of the cage in the circumferential direction in such a way that the web of the inner joint member can be inserted into this window and, thus, the inner joint member can be mounted in the cage.

In other joints, known for example from German Patent No. 1,298,785, instead of extending a cage window, one of the webs of the inner joint member is constructed axially shorter than the remaining webs and than the length of the corresponding cage window. These structures involve significant disadvantages since the cage is weakened and the service life and operating safety are thus reduced. Furthermore, by the reduction of the length of one of the webs, production of the joint becomes more difficult and economy is reduced. Moreover, such solutions can only be utilized in six-ball joints since, in this case, two cage windows or two webs of the inner joint member are always located diametrically opposite each other thereby making assembly of the cage possible.

Additionally, there are also solutions, known from German Offenlegungsschrift No. 2,620,340, wherein assembly of the cage is possible in a six-ball joint as well as in a five-ball joint. In this case, a flattened region is provided on at least one area of the outer surface of the cage. However, as can be easily seen, when a flattened region is used on the outer surface of the cage, a cage is required whose wall thickness is appropriately thick in order to enable this proposed solution to be effected. The use of an especially enlarged material thickness has the consequent disadvantage that the inner joint member and the outer joint member must accordingly be formed with a thinner construction and there will thus be a loss in strength in these parts as well. Furthermore, there are additional cumbersome operational steps required to produce the flattened regions of the cage.

In view of the foregoing, it is the task of the invention to provide a rigid joint which ensures a simple assembly procedure by using a cage which can be produced with simple techniques. Moreover, the invention seeks to achieve statically uniform strength by a uniform geometry of the workpiece, particularly of the axially extending cross-section.

SUMMARY OF THE INVENTION

Briefly, the present invention may be described as a homokinetic universal joint having an outer joint member which is provided with a spherical hollow space in whose inner surface there are arranged grooves which are uniformly distributed over the circumference, an inner joint member arranged in the outer joint member, said inner joint member having in its outer surface a number of grooves which number corresponds to the number of grooves in the outer joint member, wherein each pair of grooves of said outer and inner joint members jointly receive one of a plurality of torque-transmitting balls supported in windows of a cage which is arranged radially between the inner and outer joint members. Each of the cooperating grooves of the inner and outer joint members are widened in the direction of the opening of the outer joint member for controlling the balls in the angle-bisecting plane, and the cage is guided with its spherical outer surface in the hollow space of the outer joint member and with its spherical inner surface on the spherical outer surface of said inner joint member. The particular feature of the present is that the cage is provided, on its spherical outer surface and on the side thereof facing toward the hollow space of said outer joint member, with a reduced-diameter portion which extends in the region of a longitudinal side of the cage windows.

This design of the cage has the advantage that the cage has a uniform cross section over its entire circumference and that, due to the cage windows which are shortened but of equal length, an increase in thickness is achieved. The cage can be inserted in the outer joint member together with the inner joint member, without requiring performance of an additional separate operating step to assist in the assembly. The cage can be produced with the same production costs in such a manner that an increase of the stability of the cage is obtained.

However, the essential advantage resides in the fact that a cage produced without additional production requirements can be used for the assembly of a joint with only five balls. In devices of this type, difficulties normally arise in that two ball grooves are not always located opposite each other and, therefore, there is not sufficient space for inserting the cage. This is now made possible by the reduced portion of the cage formed in the region of the longitudinal side of the cage window.

In joint structures which have only a small back taper in the outer joint member, i.e. where the diameter of the inner hollow space is larger than the diameter of the opening only to an insignificant degree, another feature of the invention provides that the largest dimension of the reduced portion is made smaller than or equal to the smallest diameter of the opening of the outer joint member. In this case, it is advantageous to extend the reduced portion only partially in the region of the cage windows along the circumference of an end face.

In extreme cases in which the outer joint member has a large back taper, i.e. where the diameter of the hollow space of the outer joint member is significantly larger than the diameter of the opening, the reduced portion may extend over the entire circumference of the cage.

In another embodiment of the invention, the reduced portion extends from an end face to that longitudinal side of the cage window which faces toward this end face.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
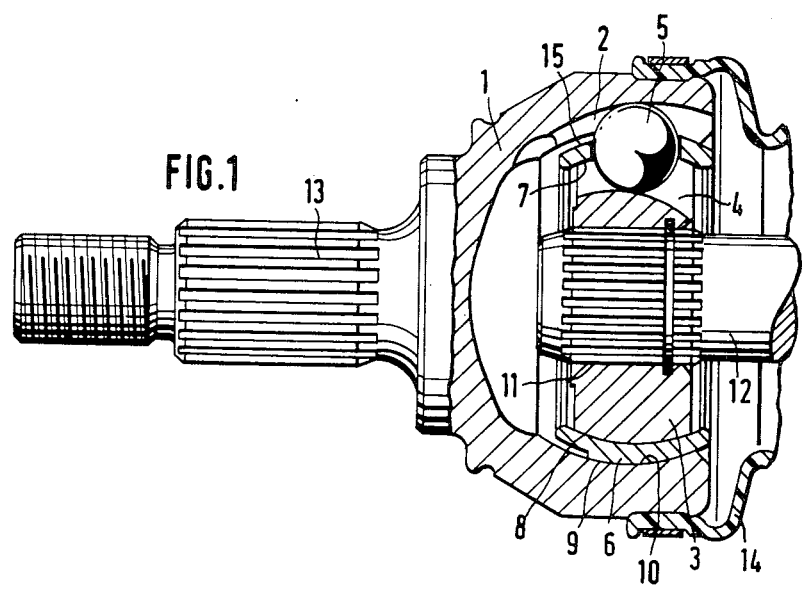
FIG. 1 is a partial sectional view of a homokinetic universal joint in accordance with the invention.

The homokinetic universal joint shown in FIG. 1 consists essentially of an outer joint member 1 which is provided with grooves 2 in its hollow inner space, an inner joint member 3 which also has grooves 4 in its outer wall, roller bodies or balls 5 each of which are received in two oppositely located grooves 2 and 4, and a cage 6 which guides the balls 5 through the windows in the cage 6 which are provided for this purpose. The ball grooves 2, 4 extend in meridian planes relative to the respective axis of the corresponding joint member, with a groove pair 2 and 4 of the outer joint member 1 and of the inner joint member 3 forming an opening in the shape of a mouth for controlling the balls 5 in the plane of constant velocity.

In a rigid joint as it is shown in the drawing, the spherical shell-shaped cage 6 serving to support the balls 5 is guided with its inner hollow space 7 on the outer spherical surface 8 of the inner joint member 3 and with its outer spherical surface 9 in the inner surface 10 of the outer joint member 1. The inner joint member 3 has a bore 11 with a toothed profile in which bore a shaft 12 is mounted in fixed rotative engagement therewith.

The torque transmission from the shaft 12 to the axle journal 13 takes place through the inner joint member 3, the balls 5, and the outer joint member 1. The joint has a sealing boot 14 to form a seal serving to prevent lubricant from leaking out and dust and dirt from entering.

On its side facing away from the opening of the outer joint member 1, the cage 6 is provided with a reduced-diameter portion 15. This reduced portion 15 extends over the entire circumference of the cage 6 from the end face of cage 6 to the region of the cage windows. The largest outer diameter of this reduced portion 15 is smaller than or equal to the smallest diameter of the opening of the outer joint member 1 in the region of its end face which faces toward the shaft 12.

Figure 2:
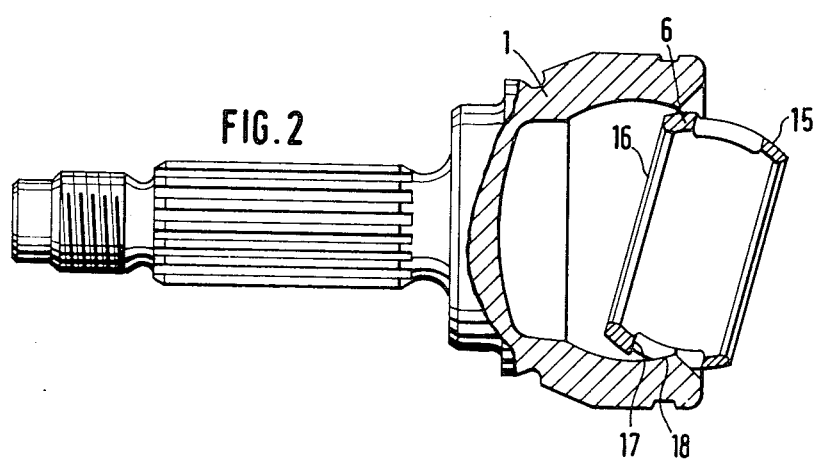
FIG. 2 is a sectional view of the outer joint member and the cage of the joint shown in FIG. 1.

FIG. 2 shows the assembly of the cage 6 in the outer joint member 1. Due to the fact that the parts are made to fit tightly together, the inner joint member 3 cannot be inserted axially immediately into the cage 6 and the cage 6 cannot be inserted axially immediately into the outer joint member 1. For this reason, it has been found to be useful to first insert the inner joint member 3 in the cage 6 and, subsequently, to insert this structural subgroup consisting of the cage 6 and the inner joint member 3 into the outer joint member 1. For reasons of simplicity, FIG. 2 merely shows how the cage 6 is inserted in the outer joint member 1. The cage is obliquely inserted into the opening of the outer joint member 1 with that side 16 which faces away from the reduced portion 15. This is done in such a manner that a window 17 of the cage 6 is arranged to have extending therethrough a web 18 which is formed between two of the grooves 2 of the outer joint member 1. Subsequently, by tilting the cage 6 into the outer joint member 1, the cage 6 can be mounted in the outer joint member 1 by passing its reduced-diameter portion 15 past the smallest diameter of the opening. The reduced-diameter portion 15 will then be in the region of the opening of the outer joint member.

Figure 3:
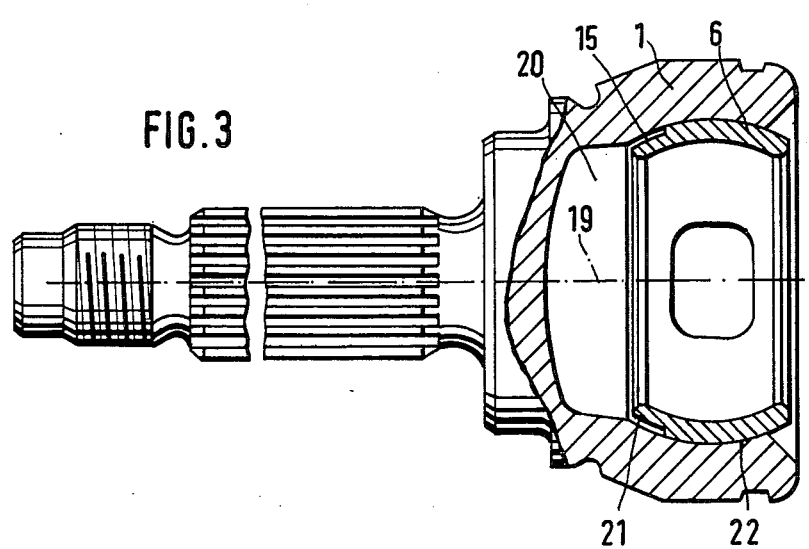
FIG. 3 is a sectional view of the outer joint member of FIGS. 1 and 2 shown with the cage in its mounted position.

FIG. 3 shows the final assembly stage between cage 6 and the outer joint member 1 wherein, after rotation about the longitudinal axis 19, the reduced-diameter portion 15 of the cage 6 is arranged on the side which faces toward the hollow space 20 of the outer joint member 1. This is especially advantageous since, in this region 21 between cage 6 and outer joint member 1, no axial forces must be absorbed by these parts. By arranging the reduced-diameter portion 15 in the region 21, the forward region 22 of the outer joint member 1 may be kept free for transmitting and absorbing axial forces.

Figure 4:
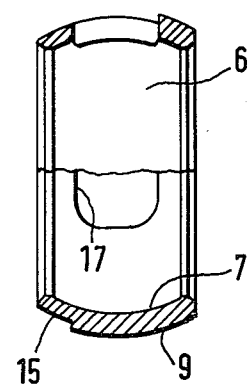
FIG. 4 is a sectional view of the cage.

In FIG. 4, which shows the cage 6 individually, it can be clearly seen that the reduced-diameter portion 15 extends in the region of an end face over the entire circumference and into the windows 17. The outer spherical surface 9 serves to guide the cage 6 in the outer joint member 1, whereas the inner hollow space 7 of the cage 6 is intended for guidance on the inner joint member 3. In structures wherein the diameter of the opening of the outer joint member 1 is larger compared to the outer spherical surface 9 of the cage 6, the reduced-diameter portion 15 can merely extend in the region of a longitudinal side of the cage window. This means that the reduced-diameter portion 15 need not necessarily extend over the entire circumference of the cage 6.

While specific embodiments of the invention have been shown and described in detail to illustrate the application of the inventive principles, it will be understood that the invention may be embodied otherwise without departing from such principles.

What is claimed is:

1. A homokinetic universal joint assembly comprising: an outer joint member including a generally spherical inner surface shaped to define a hollow space open on one side thereof with grooves formed therein uniformly distributed over the circumference thereof; an inner joint member arranged in said outer joint member, said inner joint member including a generally spherical outer surface with grooves formed therein which correspond in number to the grooves in the inner surface of said outer joint member; a plurality of roller members interposed in torque-transmitting relationship between said inner joint member and said outer joint member, said grooves being arranged such that each of said roller members will be engaged between a groove of said inner joint member and a groove of said outer joint member; a cage including apertures within which said roller members are operatively supported, said cage being arranged within said hollow space radially between said inner and said outer joint members and having concentric inner and outer spherical surfaces; each pair of cooperating grooves of said inner and said outer joint member being widened in the direction of the opening of said outer joint member for controlling said roller members in the angle-bisecting plane; said cage being guided with its spherical outer surface on the spherical inner surface of said outer joint member and with its spherical inner surface on the spherical outer surface of said inner joint member; said universal joint assembly being formed as a fixed joint with said cage operatively interposed between said inner and outer joint members to prevent axial mobility therebetween; said cage having formed on its spherical outer surface on the side thereof opposite said open side of said hollow space a reduced diameter portion extending axially over part of said cage and having a maximum diametral dimension which is not greater than the minimum diametral dimension of said hollow space, said reduced diameter portion operating to facilitate assembly of said cage and said inner joint member to within said hollow space.

2. A homokinetic universal joint assembly comprising: an outer joint member having an inner surface defining a spherical hollow space with grooves formed therein uniformly distributed over the circumference thereof; an inner joint member arranged in said outer joint member, said inner joint member having an outer surface with grooves formed therein which correspond in number to the grooves in the inner surface of said outer joint member; a plurality of balls interposed in torque-transmitting relationship between said inner joint member and said outer joint member, said grooves being arranged such that each of said balls will be engaged between a groove of said inner joint member and a groove of said outer joint member; a cage including ball apertures within which said balls are operatively supported, said cage being arranged radially between said inner and said outer joint members and having concentric inner and outer spherical surfaces; each pair of cooperating grooves of said inner and said outer joint member being widened in the direction of the opening of said outer joint member for controlling said balls in the angle-bisecting plane; said cage being guided with its spherical outer surface in the hollow space of said outer joint member and with its spherical inner surface on the spherical outer surface of said inner joint member; said cage having formed on its spherical outer surface on the side thereof facing toward said hollow space of said outer joint member a reduced diameter portion which extends in the region of the longitudinal side of said ball apertures; said cage being formed with a pair of opposite end faces with said ball apertures being formed with longitudinal sides each arranged adjacent one of said end faces, said reduced diameter portion of said cage extending from one of said end faces to the longitudinal side of said ball apertures which is most remote from said one end face.

3. A joint assembly according to claim 2 wherein said one end face from which said reduced-diameter portion extends is located on a side of said cage most remote from the opening of said hollow space of said outer joint member when said joint assembly is in its assembled operative condition.

* * * * *